United States Patent [19]

Muckler

[11] Patent Number: 5,275,130
[45] Date of Patent: Jan. 4, 1994

[54] ANIMAL FEEDER HAVING ANIMAL ACTUATED FEED TRANSPORT DEVICE BETWEEN HOPPER AND TROUGH

[75] Inventor: Gregory A. Muckler, Grinnell, Iowa

[73] Assignee: Agri/Sense, Inc., Grinnell, Iowa

[21] Appl. No.: 941,945

[22] Filed: Sep. 8, 1992

[51] Int. Cl.$^5$ .................................................. A01K 5/00
[52] U.S. Cl. ............................... 119/53.5; 119/56.1; 119/54
[58] Field of Search ............... 119/54, 55, 56.1, 53.5; 222/367, 242, 410, 425, 424.5, 448, 322, 339

[56] References Cited

U.S. PATENT DOCUMENTS

| | | | |
|---|---|---|---|
| 934,634 | 9/1909 | Terrell | 222/339 |
| 2,207,395 | 7/1940 | Brown | 222/339 |
| 2,898,010 | 8/1959 | Tepper | 222/339 |
| 2,969,769 | 1/1961 | Paschall | 119/56.1 |
| 3,129,853 | 4/1964 | Hoskins | 222/339 |
| 3,800,746 | 4/1974 | Stidham | 119/56.1 |
| 3,962,998 | 6/1976 | Lynch | 119/56.1 |
| 4,322,017 | 3/1982 | Lowdermilk | 222/242 |
| 4,560,092 | 12/1985 | Souza | 222/242 |
| 4,974,548 | 12/1990 | Lynch | 119/56.1 |

FOREIGN PATENT DOCUMENTS 2336875 7/1977 France .......................... 119/56.1

*Primary Examiner*—Gene Mancene
*Assistant Examiner*—Todd E. Manahan
*Attorney, Agent, or Firm*—G. Brian Pingel

[57] ABSTRACT

An animal feeder is actuable by an animal to provide and dispense an individual portion of feed thereto. The feeder includes a feed transport that is contained between an upper drop hole in the bottom portion of a hopper and a lower drop hole so that when the feed transport is actuated by the animal, feed is transported from the upper drop hole to the lower drop hole to fall into an animal feed station.

9 Claims, 3 Drawing Sheets

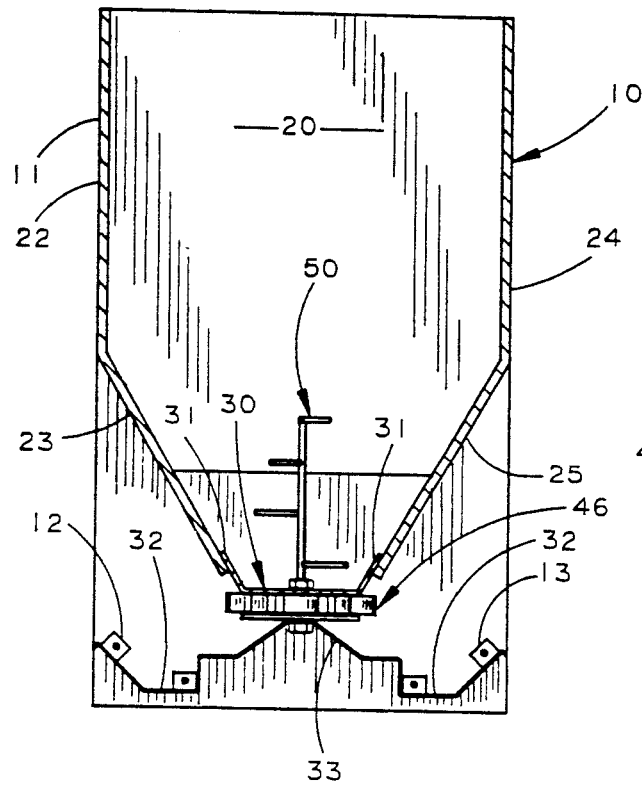
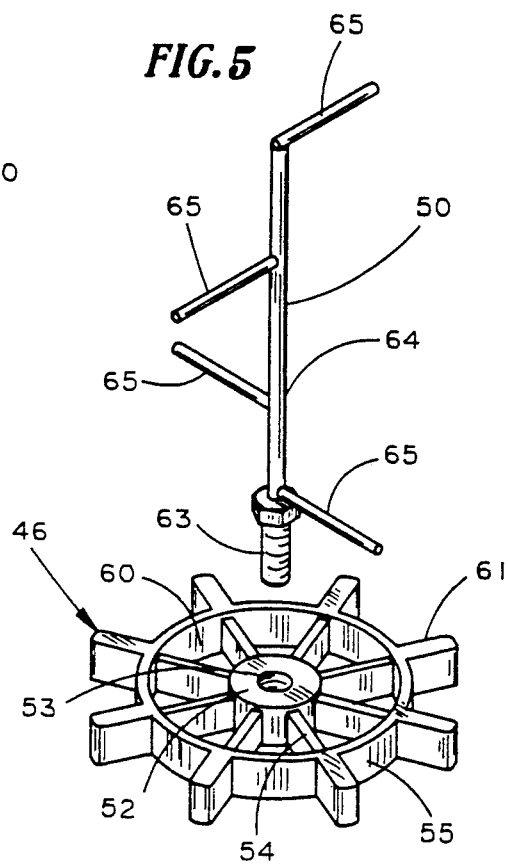
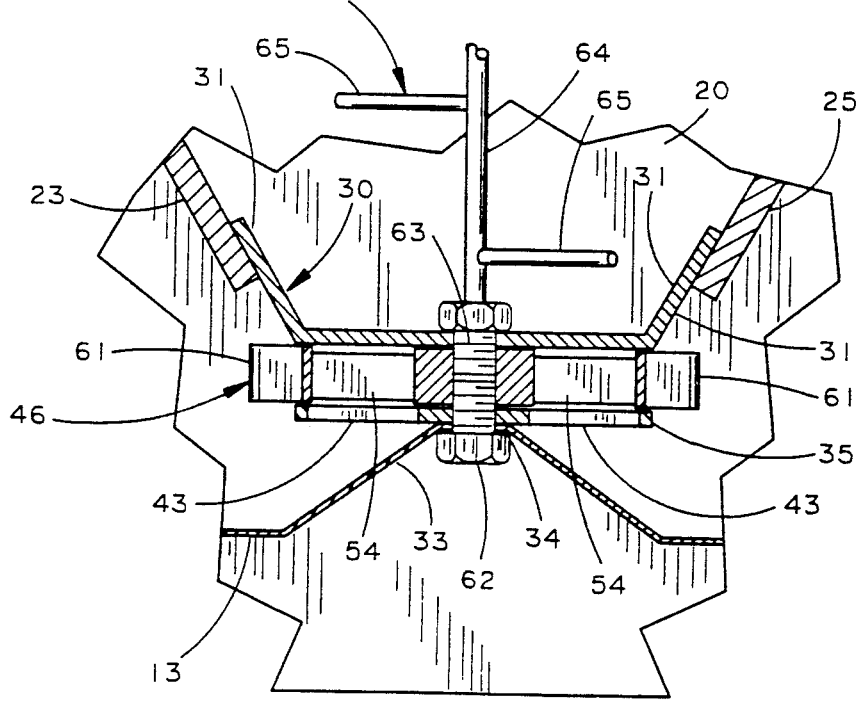

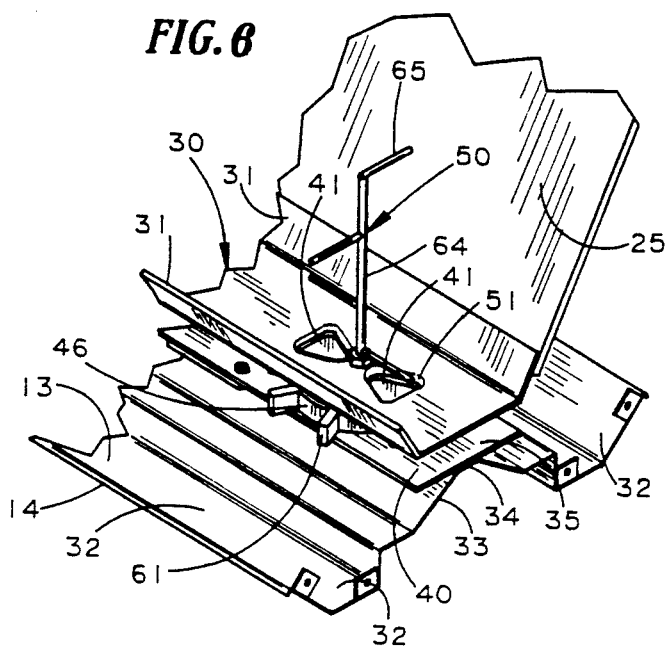
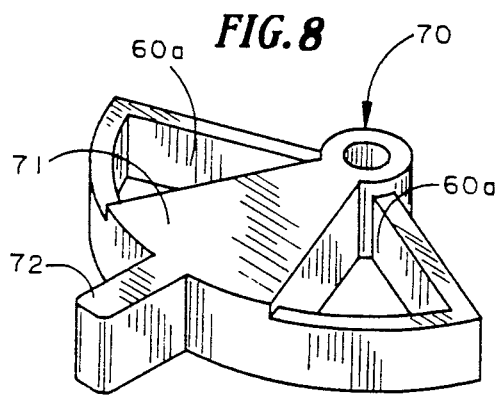
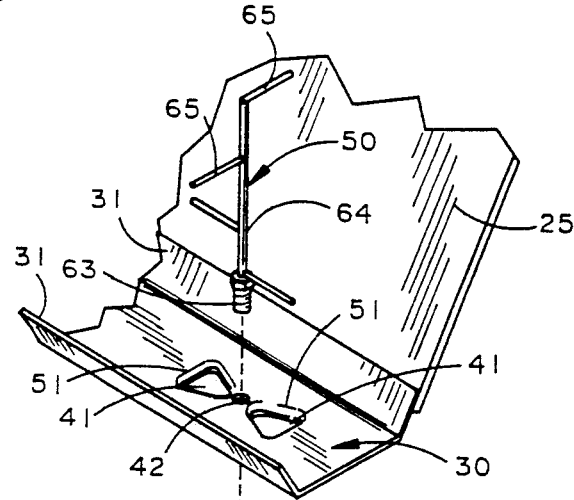
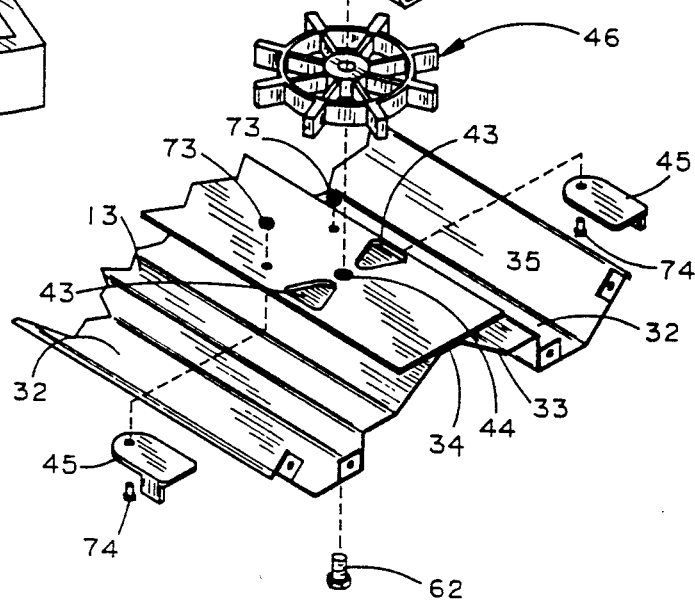

5,275,130

ANIMAL FEEDER HAVING ANIMAL ACTUATED FEED TRANSPORT DEVICE BETWEEN HOPPER AND TROUGH

BACKGROUND OF THE INVENTION

1. Field of the Invention

This invention relates in general to livestock feeders and more specifically to feeders designed to allow the animals to dispense feed themselves in individual portions.

2. Description of the Prior Art

Livestock self-feeders are well-known in the art and numerous designs have been developed in an attempt to provide efficient and effective ways to dispense feed through minimal effort by the farmer.

A typical livestock self-feeder is disclosed in Thibault, U.S. Pat. No. 4,353,329 and includes a base member having a feed trough, a hopper positioned thereabove, and a feed wheel having a plurality of uniquely designed spokes rotatably located in the circular trough. An aperture is located in the bottom of the hopper and permits feed to flow into the trough. The feed wheel includes an agitation rod that extends upwards through the aperture and into the hopper.

When the animal turns the wheel, the spokes spread the feed out in the trough. As the trough fills with feed, turning of the spokes by an animal becomes increasingly difficult and the specially designed spokes return some of the feed back towards the center of the trough. However, as the feed is consumed, the feed wheel offers less resistance to movement and additional quantities of feed are dispensed through the aperture and dispersed throughout the trough.

An inherent problem with the feeder disclosed in the '329 is the fact that the only restriction on the flow of feed through the aperture is when a sufficient amount of feed has been dispensed and retained in the trough thereby blocking the aperture. Another problem is that the feed wheel is positioned in the trough.

SUMMARY OF THE INVENTION

The present invention provides an improved livestock self-feeder that dispenses feed to livestock in an effective and efficient manner. The feeder comprises a base having a feed trough, a hopper positioned above the base, an upper feed drop member that forms a bottom portion of the hopper and has at least one upper feed drop hole located therein, a lower feed drop member located above the trough and below the upper member thereby forming a cavity between said lower and upper members and having at least one lower feed drop hole located therein in a manner so that the lower drop hole is not in vertical alignment with the upper drop hole and the lower drop hole is exposed to at least a portion of the trough, means located in the cavity to transport feed which passes through the upper drop hole to the lower drop hole, and means to allow the animal to actuate the transport means.

BRIEF DESCRIPTION OF THE DRAWINGS

FIG. 3 is a cross-sectional side view of the embodiment shown in FIG. 1 taken along the line 3—3 of FIG. 1;

FIG. 4 is a fragmentary cross-sectional side view of a feed station;

FIG. 5 is an exploded perspective view of the feed wheel and an associated agitation member;

FIG. 6 is a fragmentary perspective view of the feed station; and

FIG. 7 is a fragmentary exploded perspective view of the feed station.

FIG. 8 is a perspective view of a wedge-shaped paddle member.

DETAILED DESCRIPTION OF THE PREFERRED EMBODIMENT

With reference to the drawings, the livestock self-feeder of this invention is indicated generally at 10 in FIG. 1, and includes a hopper 11 designed for storing a quantity of feed, a base 12 having a feed trough 13 positioned below said hopper 11, and a plurality of feed stations 14, each having similar elements.

Figure 1:
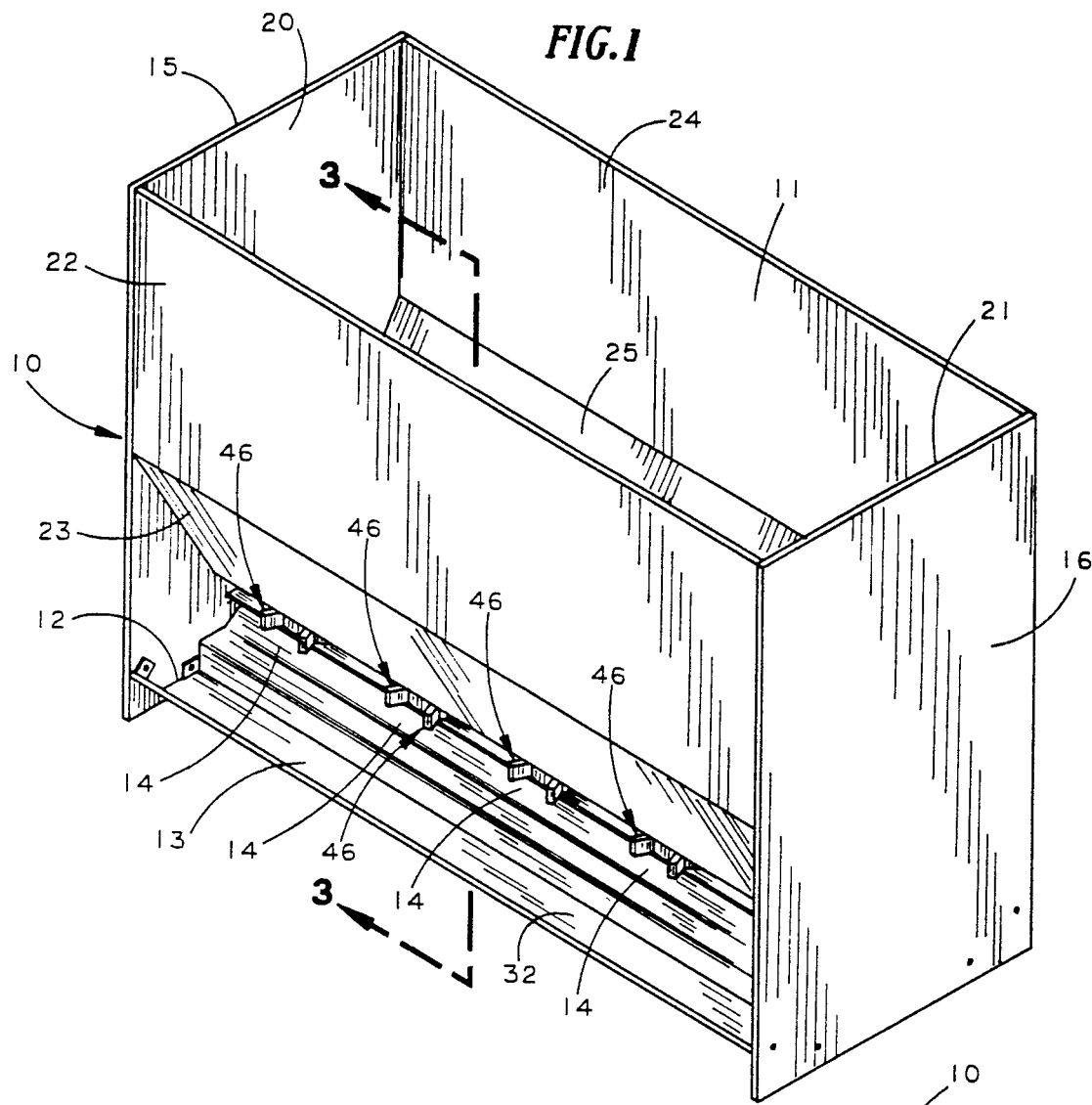
FIG. 1 is a perspective view of a preferred embodiment of the livestock self-feeder of the present invention.
Figure 2:
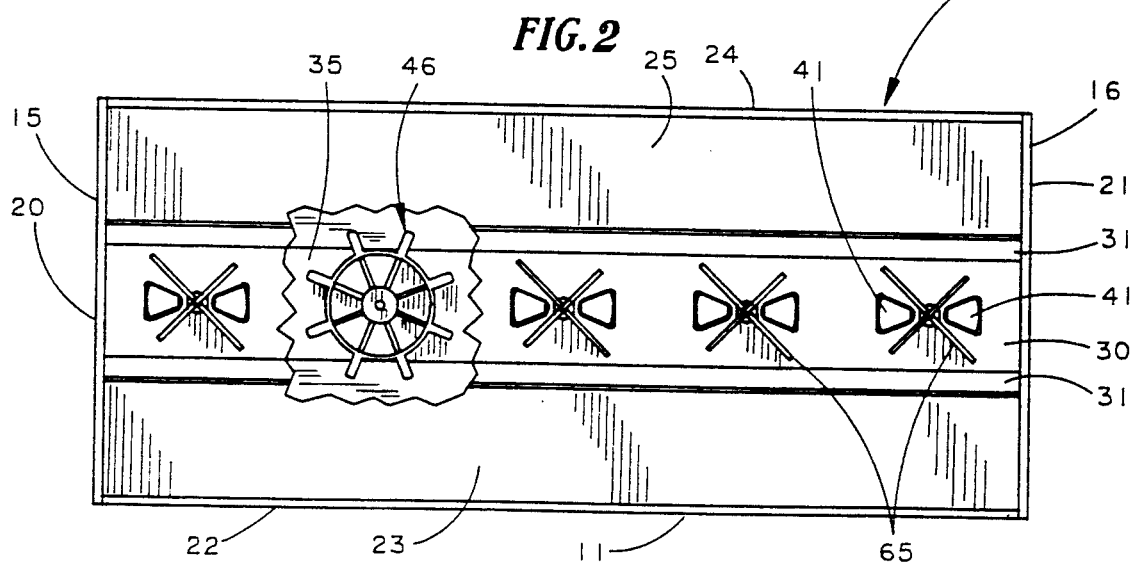
FIG. 2 is a top view of the embodiment shown in FIG. 1 with an entire feed wheel exposed.

Referring to FIGS. 1-3, upper portions of left and right side panels 15 and 16 form left and right side walls 20 and 21 of the hopper 11. The hopper 11 also has a front wall 22 having a first inclined portion 23, and a rear wall 24 having a second inclined portion 25. The inclined portions 23 and 25 direct the quantity of feed stored in the hopper 11 towards the middle of the bottom of said feeder 10.

An upper feed drop member 30 forms the bottom of the hopper 11 and, as shown best in FIGS. 3 and 4, preferably has a pair of upwardly directed flanges 31 which are designed to provide welding surfaces so that said upper member 30 can be permanently affixed to the bottom of the inclined portions 23 and 25. It should be readily recognized by those skilled in the art, however, that there are numerous ways to secure said upper member 30 other than that disclosed.

The feed trough 13 is formed preferably from a single piece of material such as steel, aluminum, or plastic, and has a pair of parallel feeding channels 32 designed to receive and expose a portion of the feed to the animals. As shown in FIG. 6, the channels 32 are separated by an inverted channel 33 which has a mating surface 34 raised above said feeding channels 32. Running the length of the trough 13 is a lower feed drop member 35 that is secured to the mating surface 34 in a manner so that an equal portion of the lower member 35 extends out on either side of said mating surface 34.

When the feeder 10 is assembled, the left and right side panels 15 and 16 are secured to both the ends of the front and rear walls 22 and 24 of the hopper 11 and the ends of the trough 13. The lower portions of the left and right side panels 16 and 17, along with the trough 13, form the base 12. Also, as best shown in FIG. 6, the upper and lower members 30 and 35 are spaced apart in a generally vertical alignment with each other so that a cavity 40 running the entire length of the feeder is formed between them.

Referring now to the feed stations 14 which are best shown in FIG. 7, each occupies a portion of the cavity 40 and the trough 13, and is generally comprised of a pair of oppositely situated, pie-shaped upper drop holes 41 that are separated by an upper axle hole 42, a pair of oppositely situated, pie-shaped lower drop holes 43 that are separated by a lower axle hole 44 which is in vertical alignment with the hole 42, pivotal lower hole covers 45, and a feed wheel 46 that has an agitation member 50.

The upper drop holes 41 are cut in the upper member 30 and allow feed to escape the hopper into the cavity 40. The upper drop holes 41 are preferably set in recessed draft portions 51 for a purpose to be described later and are aligned in a generally longitudinal relationship with said upper member 30.

The lower drop holes 43 are cut in the lower member 35 and are aligned in a generally transverse relationship with said lower member 35 so that neither are in vertical alignment with either of the upper drop holes 41 and each lower drop hole 43 is exposed to one of the feed channels 32.

Referring now to FIG. 5, the feed wheel 46 is designed to provide a means to transport the portion of feed that passes through the upper drop holes 41 to the lower drop holes 43 and has a hub 52 with a threaded throughbore 53, a plurality of spokes 54 radially extending outward from said hub 52, and a generally circular rim 55 connected to the outer ends of said spokes 54. A plurality of generally pie-shaped feed transport sections 60 are thus created, each formed from a pair of consecutive spokes 54 and a portion of the rim 55 between said spokes 54. Extending radially outward from the rim are a plurality of levers 61 which provide a means to allow the animals feeding to rotate the feed wheel 46 with their snouts.

The width of the wheel 46, designated by the width of the rim 55, is slightly smaller than the overall depth of the cavity 40 so that the wheel 46 may fit within the cavity 40. Furthermore, the diameter of the rim 55 is slightly smaller than the overall width of the cavity 40 so that the only portion of the wheel 46 extending out past either side of the cavity 40 are the levers 61. Critical to the operation of the invention is that the number of levers 61 used, along with their positioning on the rim 55, must be selected so that at a minimum, one lever 61 is at all times exposed outside the cavity 40.

To rotatably secure the feed wheel 46 within the cavity 40, a lower bolt 62 is inserted up through the lower axle hole 44 and into the lower portion of the throughbore 53. Next, an upper bolt 63 is inserted through the upper axle hole 42 and into the upper portion of the throughbore 53. Both bolts 62 and 63 are then tightened sufficiently enough to maintain the positioning of the feed wheel 46 while allowing it to be freely rotated within the cavity 40.

Extending upward from the upper bolt 63 is the agitation member 50 having an agitation shaft 64 with a plurality of horizontally aligned agitation rods 65 positioned thereon at various points of the shaft 64. Thus, when the feed wheel 46 is rotated, the agitation member 50 is also rotated thereby preventing cloggage of the feed near the upper drop holes 41 necessary to facilitate continuous feed flow.

The operation of the invention is based upon the well known principle in the art that certain types of livestock, especially swine, possess a level of intelligence that allow them to operate self-feeders. Thus, the feed stations 14 of the present invention provide a method of operation that allows these animals to utilize such intelligence to dispense feed themselves.

In operation, the feed dispensing process starts with a portion of the feed stored in the hopper 11 passing through the upper drop holes 41 into the pie-shaped feed transport sections 60 of the feed wheel 46. Next, the animal feeding rotates the feed wheel 46 by turning the levers 61 with its snout. When the feed wheel 46 is rotated, the portions of feed just passing through the upper drop holes 41 into the transport sections 60 are transported or rotated to the lower drop holes 46 where they then drop into their respective feed channels 32. Thus, as the animals quickly learn this simple feed dispensing process, portions of feed will continually be dispensed into the feed trough 13 as long as the feed wheel 46 is rotated and there is feed in the hopper 11.

It should be recognized that the feed transport means of the present invention is not restricted or limited to the feed wheel 46 configuration disclosed herein. For example, as disclosed in FIG. 8, said means can be embodied in a wedge-shaped paddle member 70 having a pair of second feed transport sections 60a separated by a similarly pie-shaped solid section 71 with an outward extending paddle handle 72. Designed to reciprocate rather than rotate, the paddle member 70 can be moved from side to side by the feeding animal necessary to dispense portions of feed. Accordingly, although not shown, upper and lower feed drop holes should be positioned appropriately to facilitate the paddle member 70 configuration.

Once the trough 13 becomes too full or if only a certain number of feeding stations 14 are required, the farmer can then simply close the appropriate lower drop holes 43 by rotating the associated lower drop hole covers 45. As best shown in FIG. 7, the lower hole covers are pivotally connected at one end to a point next to their respective lower drop holes using a common nut 73 and bolt 74.

An inherent problem with many rotary self-feeders is that an excess amount of feed surrounding the feed wheel 46 causes friction that restricts or hinders the rotation of the feed wheel 46. The draft portions 51 substantially reduce this problem by eliminating any excess feed from entering into the transport sections 60 of the feed wheel 46. Essentially, this is accomplished because the draft portions 51 are set lower than the rest of the upper member 30 so that the amount of feed entering into the transport sections 60 does not occupy all of the space provided by the cavity 40 as the wheel 46 rotates. This resulting unoccupied space in the cavity 49 above the portion of feed thus minimizes the resistance the feed has on the rotation of the feed wheel 46. It should be also noted that in order to accommodate the draft portions 51, the width of the spokes 54 must be reduced accordingly, as best shown in FIGS. 4 and 5.

Thus, the present invention provides an efficient and effective device for dispensing feed to livestock. Although a single detailed embodiment has been disclosed herein, it should be well recognized and understood by those skilled in the art that numerous modification can be made to the structure of the device 10 without departing from the true spirit and scope of the present invention.

I claim:

1. An animal feeder designed to be actuable by an animal to provide and dispense an individual portion of feed thereto, the feeder comprising:
    (a) a base having a feed trough for receiving and exposing feed to the animals, said feed trough having at least one feed station;
    (b) a hopper located above the base for storing a quantity of feed;
    (c) an upper feed drop member which forms a bottom portion of the hopper, said upper member having at least one upper feed drop hole located therein;

(d) a lower feed drop member located above said base and below said upper member forming a cavity between said lower and upper members, the lower member having at least one lower feed drop hole located therein in a manner so that said at least one lower drop hole is not in vertical alignment with said at least one upper drop hole and said at least one lower drop hole is exposed to at least a portion of the trough;

(e) feed transport means movably located within said cavity for transporting feed which passes though the at least one upper drop hole to the at least one lower drop hole to pass down into the at least one feed station; and (f) actuating means extending from the feed transport means into said trough for allowing the animal to move the transport means.

2. An animal feeder as recited in claim 1 wherein said feed transport means comprises:
(a) a hub;
(b) an axle vertically positioned in the middle of said hub;
(c) at least two, oppositely situated spokes radially extending from said hub; and
(d) a generally circular rim connected to the outer ends of said spokes.

3. An animal feeder as recited in claim 2 wherein said actuating means comprises at least four levers radially extending outward from said rim in a generally symmetrical fashion.

4. An animal feeder as recited in claim 2 further comprising means for agitating said feed in the hopper.

5. An animal feeder as recited in claim 4 wherein said agitation means comprises:
(a) a vertically aligned agitation shaft connected at one end to said hub and directed generally upward into said hopper; and
(b) at least one elongated agitation rod connected at one end to the shaft in a generally perpendicular orientation.

6. An animal feeder as recited in claim 1 further comprising a means to cover and uncover said at least one lower drop hole.

7. An animal feeder as recited in claim 1 wherein said at least one upper drop hole is located in a recessed draft portion.

8. An animal feeder designed to be actuable by an animal to provide and dispense an individual portion of feed thereto, the feeder comprising:
(a) a hopper for storing a quantity of feed;
(b) a base located below the hopper having a feed trough designed to expose feed to the animals on either side of said hopper;
(c) an upper feed drop member which forms a bottom portion of the hopper; said upper member having at least one pair of oppositely situated upper feed drop holes located therein;
(d) a lower feed drop member located above said trough and below said upper member forming a cavity between said upper and lower members, the lower member having at least one pair of oppositely situated lower feed drop holes located therein in a manner so that neither lower drop hole is in vertical alignment with either upper drop hole and each said lower drop hole is exposed to at least a portion of the trough;
(e) feed transport means located within said cavity for transporting feed which passes through said upper drop holes to the lower drop holes, said transport means including a plurality of feed transport section; and
(f) an actuating means extending from the feed transport means into said trough for allowing the animal to actuate the transport means.

9. An animal feeder designed to be actuable by an animal to provide and dispense an individual portion of feed thereto, the feeder comprising:
(a) a base having a feed trough for receiving and exposing feed to the animals, said feed trough having at least one feed station;
(b) a hopper located above the base for storing a quantity of feed;
(c) an upper feed drop member which forms a bottom portion of the hopper, said upper member having at least one upper feed drop hole located therein;
(d) a lower feed drop member located above said base and below said upper member forming a cavity between said lower and upper members, the lower member having at least one lower feed drop hole located therein in a manner so that said at least one lower drop hole is not in vertical alignment with said at least one upper drop hole and said at least one lower drop hole is exposed to at least a portion of the trough;
(e) feed transport means rotatably located within said cavity for transporting feed which passes through the at least one upper drop hole to the at least one lower drop hole to pass down into the at least one feed station; and
(f) actuating means extending from said feed transport means into the at least one feed station for allowing the animal to rotate the transport means at least a distance sufficient to cause feed to be transported from the at least one upper drop hole to the at least one lower drop hole.

* * * * *